May 16, 1944. W. H. LYCAN ET AL 2,349,047
PREPARATION OF MONOMERS OF CYCLOPENTADIENE
Filed May 24, 1941

INVENTORS
W. H. LYCAN and
HOWARD L. GERHART

BY Olen E. Bee
ATTORNEY.

Patented May 16, 1944

2,349,047

UNITED STATES PATENT OFFICE 2,349,047

PREPARATION OF MONOMERS OF CYCLOPENTADIENE

William H. Lycan and Howard L. Gerhart, Milwaukee, Wis., assignors to Pittsburgh Plate Glass Company, a corporation of Pennsylvania Application May 24, 1941, Serial No. 395,063

5 Claims. (Cl. 260—666)

The present invention relates to the preparation of diene hydrocarbons, such as cyclopentadiene from the dimer thereof, and it has particular relation to the preparation of cyclopentadiene from dicyclopentadiene by pyrogenetic decomposition.

One object of the invention is to provide a process of the foregoing type which is rapid in operation and which, when employed, results in substantially quantitative yields of cyclopentadiene.

A second object of the invention is to provide convenient and efficient apparatus for separating and recycling uncracked dicyclopentadiene and for liquefying, collecting and absorbing the cyclopentadiene.

These and other objects of the invention will be apparent from consideration of the following specification and claims.

Dicyclopentadiene is obtained in certain hydrocarbon fractions resulting as by-products of municipal gas, coal tar and petroleum industries. It has a boiling point of about 170° C. and decomposes at the latter temperature into cyclopentadiene, having a boiling point of 42° C. Accordingly, it has been proposed to prepare cyclopentadiene from the dicyclopentadiene by distilling of the latter through a fractionating column. However, this method has not been satisfactory because in the distilling process dicyclopentadiene tends not only to decompose, but also to condense or polymerize in order to form compounds which do not readily crack or split to form the monomer. The reaction is also relatively slow and inefficient and cannot be used with dilute dicyclopentadiene.

According to the provisions of the present invention the foregoing difficulties are overcome by subjecting dicyclopentadiene to a process of cracking or pyrogenetic splitting by flowing it as a thin film over a surface heated to the temperature of cracking or splitting of the dimer while continuously removing the vaporized cyclopentadiene and the unvaporized products from the cracking operation. As a further feature the invention involves the provision of an improved process of an apparatus for eliminating absorbed cyclopentadiene from the unvaporized component from the reaction.

Figure 1:
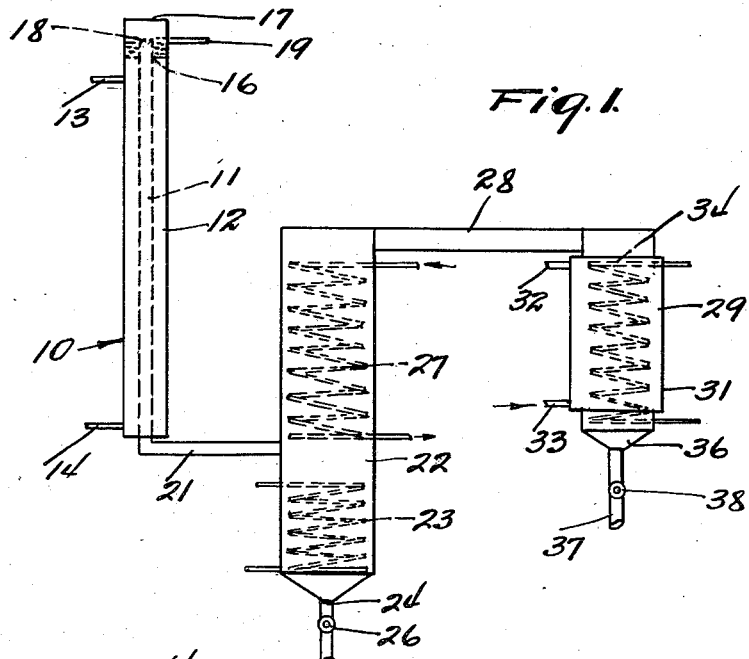

For a better understanding of the invention reference may now be had to the accompanying drawing in which Figure 1 illustrates diagrammatically one embodiment of apparatus suitable for use in the practice of the invention.

Figure 2:
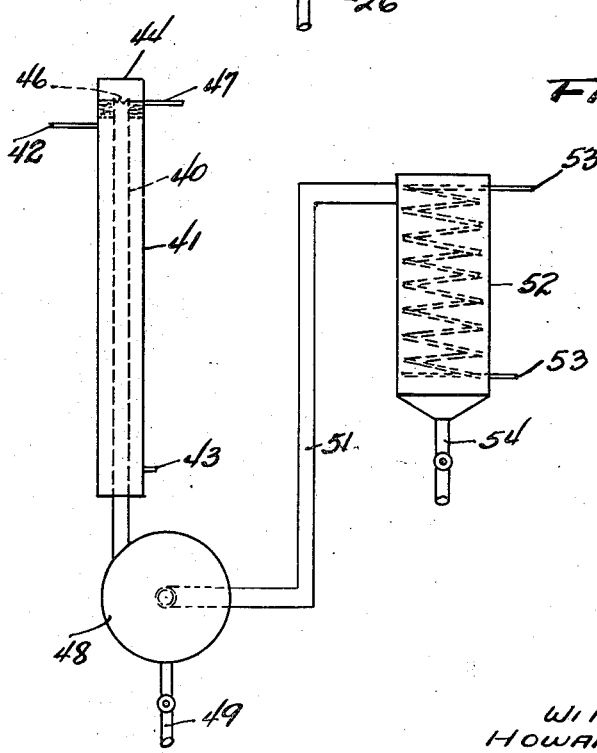

Figure 2 is a diagrammatic view of a slightly modified form of the invention.

In the drawing like numerals refer to like parts throughout.

The apparatus as shown in Fig. 1 comprises a cracking column or tower 10, including a central tube 11 having a jacket 12 for a heating medium, such as high pressure steam or hot water, which may be introduced into the jacket by conduit 13 and drawn off through outlet 14. The tube 11 projects upwardly through the bottom 16 of a header or drum 17 constituting an inlet receiver for dicyclopentadiene mixture designed to undergo treatment. The tube at its upper edge may be notched or serrated as indicated at 18 and may, also, project a short distance above the bottom 16 of the header, in order to assure a small pool of dicyclopentadiene mixture at all times. Dicyclopentadiene mixture is continuously or intermittently supplied to the header through inlet conduit 19 leading to a suitable source of supply and overflows the upper edge of the tube through the serrations 18. It trickles downwardly as a thin film over the heated surface of the tube, thus effecting rapid and efficient splitting of the dicyclopentadiene and vaporization of the monomer.

At its lower extremity the tube 11 may be bent laterally as indicated at 21 to discharge into a separator chamber or column 22. The lower portion of this column extending below the inlet 21 is designed to receive non-vaporous components from the cracking tube and is provided with heating means, such as coil 23 for high pressure steam. Liquids collecting in the lower portion of the column 22 and contacting with the coil 23 are heated to a temperature sufficient practically instantaneously to vaporize any cyclopentadiene contained therein. The unvaporized components including xylol and possibly a small amount of dicyclopentadiene and decomposition products is drawn off from the bottom of the column through a conduit 24, having a control valve 26. The upper portion of the column 22 may be heated, for example, by a hot water coil 27, in order to assure the maintenance of the cyclopentadiene in the upper portion of the column in vapor phase.

A horizontal tube or gooseneck 28 extends laterally from the upper extremity of the column 22 and discharges into a condenser column 29, which may be provided with a jacket 31, which jacket may be provided with an inlet 32 and an outlet 33 for a cooling medium, such as ice water. The space within the column may further be cooled by means of a coil 34 through which ice water or the like cooling medium is also circulated. The lower portion of the column terminates in a conical portion 36, having at its apex an outlet or discharge conduit 37, which may be provided with a control valve 38. Discharge line 37 may lead to a receiver which may be filled with an absorption medium, such as a drying oil or any other suitable medium. The conduit may also constitute a connection for the application of vacuum to the system. If vacuum is applied the pressure may be within any convenient range, for example 25 to 500 m. m. absolute.

In the operation of the embodiment of apparatus herein disclosed dicyclopentadiene constituting the material to be pyrogenetically split may be in the form of a solution such as a solution in xylol of a concentration of less than 90 percent and usually within a range of 60 to 70 percent. The temperature of the cracking tube 11 will be maintained within a range of about 180 to 200° C. The temperature of the coil 23 may be that of steam within a range of about 100 to 110 pounds per sq. inch. The coil in the upper portion of the column 22 will be maintained at a temperature of about 60 or 80° C. or sufficient to maintain the cyclopentadiene in vaporous condition, but sufficiently low to condense any less volatile materials, such as dicyclopentadiene xylol or the like, vapors of which may find their way into the zone of the coil.

It will be apparent that in the operation of the apparatus the dicyclopentadiene mixture trickles down over the heated surface of the tube 11 as a thin, relatively uniform film and is very quickly brought to the cracking temperature. The cyclopentadiene, pyrogenetically produced, is very volatile and separates from the liquid phase flowing down the surface and is thus to a large extent quickly eliminated from the reaction zone. This helps to prevent any possible repolymerization of the freshly formed monomer. The monomer in vapor phase is quickly passed to the relatively cool zone in the upper part of the column 22 and from there passes through conduit 28 to the condenser 29. The apparatus assures the rapid and relatively complete conversion of dicyclopentadiene into cyclopentadiene with a minimum production of higher polymers and other objectionable substances. The cyclopentadiene is also thoroughly and efficiently eliminated from the unvaporized products passing from the cracking zone.

In the form of the invention illustrated in Fig. 2 the cracking column closely resembles in design and function the column 10 already described. It includes a central tube 40, a jacket 41. This jacket has inlet 42 and outlet 43 for a heating medium. The upper extremity of the column of tube 40 projects into header or drum 44 and is serrated as indicated at 46 to promote uniform distribution of dicyclopentadiene mixture upon the surface of the tube as it overflows. The mixture to be treated is admitted to the header by means of conduit 47.

The tube 40 at its lower extremity discharges tangentially into a separator chamber 48 designed to effect centrifugal separation of liquid discharge products from the cyclopentadiene vapors. The liquids including xylol and polymerization products pass off through conduit 49 to a receiver. The vapors are drawn off through the center of the chamber 48 by means of conduit 51 and pass through a condenser or absorber chamber 52, which may be provided with a cooling coil 53 and an outlet 54 for the liquid products collected in the chamber. The operation of this embodiment of the invention is essentially the same as that described in connection with Fig. 1 of the drawing.

The forms of the invention herein shown and described are to be considered merely as exemplary. It will be apparent to those skilled in the art that numerous modifications may be made therein without departure from the spirit of the invention or the scope of the appended claims.

What I claim is:

1. A process of preparing cyclopentadiene from dicyclopentadiene, which process comprises trickling dicyclopentadiene as a thin film over a surface heated to a temperature sufficient to crack the dicyclopentadiene and drawing off the resultant vapors of cyclopentadiene.

2. A process as defined in claim 1, in which the cracking operation is performed at a temperature of about 180 to 200° C.

3. A process of preparing cyclopentadiene from dicyclopentadiene, which process comprises flowing dicyclopentadiene in solution in diluent over a surface heated to the cracking temperature of dicyclopentadiene, drawing off the cyclopentadiene in vapor phase from the cracking zone and drawing off the diluent and other liquid phase components from the reaction, passing the vapors and the liquid components into an intermediate portion of a column, which column is heated at its lower portion to a temperature sufficient to vaporize absorbed cyclopentadiene and is heated in its upper portion to a temperature sufficient to maintain cyclopentadiene in vaporized state without polymerization, but to condense diluent and other high boiling components from the reaction zone, then subsequently drawing off the cyclopentadiene from the upper portion of the column and drawing off the liquid phase components from the lower portion of the column.

4. A process of preparing cyclopentadiene from dicyclopentadiene, which process comprises trickling dicyclopentadiene in liquid phase as a thin film down a surface of a tube heated to a temperature within the range of cracking of dicyclopentadiene to form cyclopentadiene and drawing off the vapors of cyclopentadiene from the liquid.

5. A process of preparing cyclopentadiene from dicyclopentadiene, which comprises trickling dicyclopentadiene in liquid phase as a thin film down a surface of a tube heated to a temperature within the range of cracking of dicyclopentadiene and drawing off the unreacted dicyclopentadiene and the vapors of cyclopentadiene from the chamber and passing them together with the liquids into an intermediate portion of a second chamber, collecting the vapors in the upper portion of the chamber and the liquids in the lower portion of the chamber, the latter portion being maintained at a temperature to drive off cyclopentadiene from the liquids and the upper portion being maintained at a lower temperature, but sufficiently high to assure vaporization of the cyclopentadiene, then drawing the cyclopentadiene vapors into a zone chilled to a temperature sufficiently to condense them.

WILLIAM H. LYCAN.
HOWARD L. GERHART.